United States Patent Office 3,538,145
Patented Nov. 3, 1970

3,538,145
MALIC ACID ESTERS
John William Hirzy, St. Louis, Mo., assignor to Monsanto Company, St. Louis, Mo., a corporation of Delaware
No Drawing. Filed Apr. 10, 1967, Ser. No. 629,372
Int. Cl. C07c 69/80
U.S. Cl. 260—475                                9 Claims

ABSTRACT OF THE DISCLOSURE

This invention relates to novel esters of malic acid which are useful as plasticizers for halogen-containing vinyl resins.

---

This invention relates to a new class of chemical compounds. More particularly, this invention relates to novel esters of malic acid. These compounds have been found useful as plasticizers for halogen-containing vinyl resins.

The novel malic acid esters have the general formula,

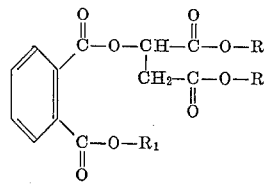

where R and $R_1$ are unlike radicals; R is selected from the group consisting of alkyl having 1 to 20 carbon atoms, mixed alkyl having 6 to 18 carbon atoms, cycloalkyl having 4 to 18 carbon atoms, arakyl having 7 to 11 carbon atoms and aryl having 6 to 10 carbon atoms, and $R_1$ is selected from the group consisting of aralkyl having 7 to 11 carbon atoms and a radical of the structure —$R_2CO_2R_3$ wherein $R_2$ is alkylene of 1 to 4 carbon atoms and $R_3$ is selected from the group consisting of alkyl having 1 to 20 carbon atoms, cycloalkyl having 4 to 18 carbon atoms, aralkyl having 7 to 11 carbon atoms and aryl having 6 to 10 carbon atoms.

It is a primary object of this invention to provide novel esters of malic acid.

It is a further object to provide a novel class of esters of malic acid which are useful as plasticizers for halogen-containing vinyl resins.

Other objects and advantages of the invention will be apparent to those skilled in the art from the following detailed description and claims.

It has been found that the heretofore-described esters of malic acid can be readily prepared by heating, in equimolar quantities, phthalic anhydride, a symmetrical ester of malic acid, a tertiary amine and an aralkyl halide or an aliphatic, cycloaliphatic or aryl ester of a lower haloalkanoic acid.

The alkyl and cycloalkyl radicals can be derived from many sources. For example, the alkyl radicals can be straight or branched chain radicals having up to 18 carbon atoms derived from various sources such as alcohols, including alcohols produced by the oxo synthesis or alcohols obtained by catalytic hydrogenation of coconut oil, from oxidized waxes or from esterification of a carbonyl group by reaction with an olefin. Illustrative examples of alkyl radicals are methyl, ethyl, propyl, isopropyl, n-butyl, isobutyl, sec.-butyl, tert.-butyl, n-amyl, isoamyl, n-hexyl, isohexyl, 2-ethylheptyl, 2-ethylhexyl, octyl, isooctyl, 2-octyl, isononyl, decyl, lauryl, tetradecyl, pentadecyl, octadecyl, allyl, crotyl, oleyl, alkyl radicals, derived by $C_3$ to $C_{20}$ oxo alcohols, etc. Illustrative examples of cycloalkyl radicals are cyclobutyl, cyclopentyl, 2-methylcyclopentyl, 3-methylcyclopentyl, 2,4-dimethylcyclopentyl, cyclohexyl, 3,5-dimethylcyclohexyl, gem.-dimethylcyclohexyl, cyclohexylmethyl, cyclohexylpropyl, methylcyclohexylethyl, 2-propycyclohexyl, 3-dodecylcyclohexyl, cycloheptyl, 2,4-dimethylcycloheptyl, 2,3,5-trimethylcycloheptyl, etc. Illustrative examples of aryl radicals are phenyl, naphthyl, etc. Illustrative examples of aralkyl radicals are benzyl, 4-methylbenzyl, 3-phenylpropyl, phenethyl, etc.

The mixed alkyl radicals can be derived from mixtures of straight chain aliphatic alcohols having between 6 and about 18 carbon atoms. These are represented by the alcohols marketed by Continental Oil Company under the trade name Alfol 610, Alfol 810, Alfol 1214, Alfol 1216 and Alfol 1618 and alcohols marketed by Archer Daniels Midland Company under the trade name Adol 9, Adol 12, Adol 52 and Adol 63. Alfol 610 is a mixture of saturated straight chain hydrocarbon monohydric alcohols having the following approximate composition: 20% $C_6$ alcohols, 35% $C_8$ alcohols and 44% $C_{10}$ alcohols. Alfol 810 consists primarily of 43% $C_8$ alcohols and 55% $C_{10}$ alcohols. Alfol 1214 comprises approximately 55% $C_{12}$ alcohols and 43% $C_{14}$ alcohols. Alfol 1216 has a composition approximating 63% $C_{12}$ alcohols, 24% $C_{14}$ alcohols and 10% $C_{16}$ alcohols. Alfol 1618 contains primarily 2% $C_{14}$ alcohols, 63% $C_{16}$ alcohols, 30% $C_{18}$ alcohols and 2% $C_{20}$ alcohols. Adol 9 is a mixture of straight chain fatty alcohols having the following approximate composition: 55% $C_8$ alcohols, 35% $C_{10}$ alcohols, and 10% $C_{12}$ alcohols. Adol 12 consists primarily of 2% $C_{10}$ alcohols, 90% $C_{12}$ alcohols and 8% $C_{14}$ alcohols. Adol 52 has an approximate composition of 4% $C_{14}$ alcohols, 90% $C_{16}$ alcohols and 6% $C_{18}$ alcohols. Adol 63 comprises 1% $C_{12}$ alcohols, 6% $C_{14}$ alcohols, 30% $C_{16}$ alcohols, 60% $C_{18}$ alcohols and 3% $C_{22}$ alcohols.

Tertiary amines suitable for use in preparing the compounds of this invention can be represented by the formula:

wherein $R_1$, $R_2$ and $R_3$ are like or unlike saturated aliphatic radicals. Preferably, $R_1$, $R_2$ and $R_3$ have a total of 3 to 24 carbon atoms, and it is also preferred that $R_1$, $R_2$ and $R_3$ be alkyl radicals. Nonlimiting examples of such tertiary amines are trimethylamine, triethylamine, tri-n-propylamine, triisopropylamine, tri-n-butylamine, triisoamylamine, trihexylamine, methyldiethylamine, dimethylethylamine, dimethylcyclohexylamine, dimethylhexylamine, diethylhexylamine, dimethyldecylamine and the like.

The aralkyl halides which can be used in the process of this invention are benzyl chloride, benzyl bromide and benzyl iodide, as well as the alkyl substituted benzyl halides, e.g., methylbenzyl chloride, methylbenzyl bromide, ethylbenzyl chloride, butylbenzyl chloride, dimethylbenzyl chloride and the like.

Aliphatic, cycloaliphatic and aryl esters of lower haloalkanoic acids which can be used in the process of the invention can be prepared from chloroacetic, iodacetic, 3-chloropropionic, bromoacetic, 4-chlorobutyric acid and the like.

Esters of malic acid which are useful in the practice of this invention are dimethyl malate, diethyl malate, dipropyl malate, di-n-butyl malate, diisopentyl malate, dioctyl malate, ditetradecyl malate, dioctadecyl malate, di-2-ethylhexyl malate, diisodecyl malate, di($C_6$–$C_{10}$ alkyl) malate, di($C_8$–$C_{10}$ alkyl) malate, dicyclobutyl malate, dicyclopentyl malate, dicyclohexyl malate, di-2-methyl cyclopentyl malate, di-3,5-dimethyl cyclohexyl malate, di-cyclohexylpropyl malate, di-3-dodecylcyclohexyl malate, di-2,3,5-trimethyl cycloheptyl malate, dibenzyl malate, di-3-phenylpropyl malate, diphenethyl malate, diphenyl malate and dinaphthyl malate.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

To a suitable reaction vessel having means for the addition and removal of heat, means for measuring the temperature of the reaction mass, and means for agitating the reaction mass, there is charged 148 grams (1.0 mol) of phthalic anhydride, 358 grams (1.0 mol) of di-2-ethylhexyl malate, 20 grams (0.2 mol) of triethylamine catalyst and 155 grams (1.03 mols) of isobutyl chloroacetate. The mixture is heated to a temperature of about 70° C. There is then added 90 grams (0.9 mol) of triethylamine over a period of about 15 minutes during which time the temperature of the reaction mixture rises to about 135° C. Upon completion of the addition of the triethylamine, the temperature of the reaction mixture is held at about 125° C. for about 1 hour. The resultant reaction mixture is then cooled and washed successively several times with water, dilute hydrochloric acid and aqueous sodium carbonate washes. The reaction mixture is then dehydrated under vacuum. There is obtained 492 grams (80% of theory) of isobutoxycarbonylmethyl(di-2-ethylhexyl maloyl)phthalate.

EXAMPLE 2

Following the procedure of Example 1, 148 grams (1.0 mol) of phthalic anhydride, 277 grams (1.01 mols) of dicyclohexyl malate, 111 grams (1.1 mols) of triethylamine and 133 grams (1.05 mols) of benzyl chloride are utilized to prepare benzyl(di-cyclohexyl maloyl) phthalate in good yield.

EXAMPLE 3

Following the procedure of Example 1, 148 grams (1.0 mol) of phthalic anhydride, 346 grams (1.01 mols) of di-2-ethylhexyl malate, 111 grams (1.1 mols) of triethylamine and 129 grams (1.05 mols) of ethyl chloroacetate are utilized to prepare ethoxycarbonylmethyl(di-2-ethylhexyl maloyl)phthalate in good yield.

EXAMPLE 4

Following the procedure of Example 1, 148 grams (1.0 mol) of phthalic anhydride, 176 grams (1.01 mols) of diethyl malate, 111 grams (1.1 mols) of triethylamine and 217 grams (1.05 mols) of 2-ethylhexyl chloroacetate are utilized to prepare 2-ethylhexoxycarbonylmethyl(diethyl maloyl)phthalate in good yield.

EXAMPLE 5

Following the procedure of Example 1, 148 grams (1.0 mol) of phthalic anhydride, 405 grams (1.01 mols) of diisodecyl malate, 111 grams (1.1 mols) of triethylamine and 133 grams (1.05 mols) of benzyl chloride are utilized to prepare benzyl(diisodecyl maloyl)phthalate in good yield.

EXAMPLE 6

Following the procedure of Example 1, 148 grams (1.0 mol) of phthalic anhydride, 346 grams (1.01 mols) of di-2-ethylhexyl malate, 111 grams (1.1 mols) of triethylamine and 184 grams (1.05 mols) of cyclohexyl chloroacetate are utilized to prepare cyclohexoxycarbonylmethyl(di-2-ethylhexyl maloyl)phthalate in good yield.

EXAMPLE 7

Following the procedure of Example 1, 148 grams (1.0 mol) of phthalic anhydride, 277 grams (1.01 mols) of di-cyclohexyl malate, 111 grams (1.1 mols) of triethylamine and 158 grams (1.05 mols) of isobutyl chloroacetate are utilized to prepare isobutoxycarbonylmethyl(dicyclohexyl maloyl)phthalate in good yield.

EXAMPLE 8

Following the procedure of Example 1, 148 grams (1.0 mol) of phthalic anhydride, 358 grams (1.01 mols) of di($C_6$–$C_{10}$ alkyl)malate, 111 grams (1.1 mols) of triethylamine and 198.5 grams (1.05 mols) of benzyl chloropropionate are utilized to prepare benzoxycarbonylpropyl di-($C_6$–$C_{10}$ alkyl maloyl)phthalate in good yield.

EXAMPLE 9

Following the procedure of Example 1, 148 grams (1.0 mol) of phthalic anhydride, 314 grams (1.01 mols) of dibenzyl malate, 111 grams (1.1 mols) of triethylamine and 184.5 grams (1.05 mols) of phenyl chloropropionate are utilized to prepare phenoxycarbonylpropyl(dibenzyl maloyl)phthalate in good yield.

EXAMPLE 10

Following the procedure of Example 1, 148 grams (1.0 mol) of phthalic anhydride, 286 grams (1.01 mols) of diphenyl malate, 111 grams (1.1 mols) of triethylamine and 150.5 grams (1.05 mols) of ethyl chlorobutyrate are utilized to prepare ethoxycarbonylbutyl(diphenyl maloyl) phthalate in good yield.

The advantageous properties possessed by the esters of this invention will be more fully understood by reference to the following examples.

As previously stated, the novel plasticizer esters of this invention may be used to plasticize halogen-containing vinyl resins of all types, both as a primary plasticizer and in conjunction with secondary plasticizers.

Normally, halogen-containing vinyl polymers such as polyvinyl chloride and copolymers thereof, which are widely employed in the plastics industry, are quite hard and brittle in nature and requires the addition of substantial proportions of a plasticizer to improve their workability. Since some of the plasticizer is ordinarily retained in the plastic product, it is desirable that it possess certain characteristics. Among these desirable characteristics is the ability of a plasticizer to impart low temperature flexibility to the product. It is also desirable that the plasticizer be one which does not allow the finished product to become hard and brittle and thereby easily fractured.

The halogen-containing vinyl resins thus plasticized with the novel esters of this invention may be used to produce compositions having the outstanding properties of permanence, and resistance to solvents.

The halogen-containing resins with which the novel plasticizers of this invention are suitable are those derived from such vinyl compounds as vinyl chloride, vinylidene chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide such as vinyl chloride with other monomers such as vinylidene chloride; vinyl esters of carboxylic acids, e.g., vinyl acetate, vinyl propionate, vinyl butyrate and vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compounds, e.g., styrene, ortho-chlorostyrene, para-chlorostyrene, 2,5 - dichlorostyrene, 2,4 - dichlorostyrene, paraethyl styrene, vinyl naphthalene and α-methyl styrene; dienes such as butadiene and chlorobutadiene; unsaturated amides such as acrylic acid amide and acrylic acid anilide; unsaturated nitriles such as acrylic acid nitrile; and esters of α,β-unsaturated carboxylic acids, e.g., the methyl, ethyl, propyl, butyl, amyl, hexyl, heptyl, octyl, allyl, methallyl, and phenyl esters of maleic, crotonic and fumaric acids and the like. It should be recognized that the halogenated resins containing halogens other than chlorine, e.g., bromine, fluorine and iodine, are also operable in this invention. Said hologenated resins may contain a varying proportion of halogen depending upon the nature of the resin and its contemplated use. Those copolymers in which a predominant portion, i.e., more than 50% by weight of the copolymer is made from a halogen-containing vinylidene monomer such as vinyl chloride, represent a preferred class of polymers to be treated according to this invention.

This invention is particularly applicable to polymerized vinyl chloride resins and to resins formed by the conjoint polymerization of vinyl chloride with other materials such as vinyl acetate, vinyl propionate, vinylidene chloride, methyl methacrylate or diethylmaleate.

Generally speaking about 5 to 200 parts by weight of plasticizer can be used for each 100 parts by weight of halogen-containing vinyl resin. However, it is preferred to use from about 20 to about 100 parts by weight of plasticizer per 100 parts by weight of resin.

For many purposes it may be desirable to blend other conventional additives with the plasticized vinyl halide polymer compositions of the present invention. Illustrative of such additives are fillers, dyes, pigments, heat and light stabilizers, lubricants and the like. It will be apparent that compositions containing such other additives are within the scope of this invention.

The following testing procedures are used in evaluating the physical properties of plasticizers.

Caustic extraction.—A.S.T.M. D–1239–55.

Low-temperature flexibility.—Low-temperature flexibility is one of the most important properties of elastomeric vinyl compositions. While many plasticizers will produce flexible compositions at room temperature, the flexibility of these compositions at low temperature may vary considerably; i.e., plasticized vinyl chloride compositions that are flexible at room temperature often become very brittle and useless at lower temperatures. Low-temperature flexibility tests employed herein are according to the Clash-Berg method. This method determines the torsional flexibility of a plastic at various temperatures. The temperature as which the vinyl composition exhibits an arbitrarily established minimum flexibility of the composition. This value may also be defined as the lower temperature limit of the plasticized composition's usefulness as an elastomer.

Humidity-compatibility.—This value is determined on the basis of the amount of exudation which occurred after aging in a water vapor saturated atmosphere at 80° C. The humidity-compatibility of the composition is expressed as the number of days to definite exudation.

Hardness.—A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following example illustrates the advantageous and unexpected results which are achieved by the use of the esters of the present invention in vinyl halide-containing polymers, but it is not intended that the invention be limited by or to such example.

EXAMPLE 11

One hundred parts by weight of polyvinyl chloride and 60 parts by weight of isobutoxycarbonylmethyl(di-2-ethylhexyl maloyl)phthalate, obtained in Example 1, are mixed on a rolling mill to a homogeneous blend. During the milling, substantially no fuming or discoloration is observed. Testing of the molded sheet for low-temperature flexibility, according to the procedure described above, gives a value of −21.7° C., which value denotes good low-temperature properties. The plasticized material has a Shore hardness value of 73 and a caustic extraction value of 1.0%. A humidity-compatibility value of 26 days to define exudation is obtained on this composition.

Similar results are obtained when the above ester is compared at 20, 30, 60 and 75 phr. (parts of plasticizer per hundred parts by weight of resin level.

On substituting other vinyl halide-containing resins for the polyvinyl chloride used in the foregoing example, it is found that effective plasticization results are also obtained with such other resins, numerous examples of which are well known to those skilled in the art and have been heretofore described. Results similar to those obtained in the foregoing examples are also obtained when the polyvinyl chloride is replaced by an equivalent amount of a copolymer of 95 parts of vinyl chloride and 5 parts of vinyl acetate, a copolymer of 90 parts of vinyl chloride and 10 parts of vinylidene chloride, a copolymer of 70 parts of vinyl chloride and 30 parts of diethylmaleate, etc.

When desired, mixtures of the esters and other plasticizers can be used, for example, such conventional plasticizers as diethyl phthalate, dibutyl sebacate, triethyl phosphate, trioctyl phosphate and methyl phthalyl ethylglycolate.

The plasticized vinyl halide-containing resin compositions of the present invention have good thermal stability; however, for many purposes, it may be advantageous to use known stabilizers in the plasticized compositions.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A compound of the formula

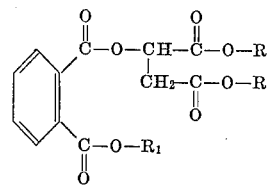

where R and $R_1$ are unlike radicals; R is selected from the group consisting of alkyl having 1 to 20 carbon atoms, mixed alkyl having 6 to 18 carbon atoms, cycloakyl having 4 to 18 carbon atoms, aralkyl having 7 to 11 carbon atoms and aryl having 6 to 10 carbon atoms, and $R_1$ is selected from the group consisting of aralkyl having 7 to 11 carbon atoms and a radical of the structure —$R_2CO_2R_3$ wherein $R_2$ is alkylene of 1 to 4 carbon atoms and $R_3$ is selected from the group consisting of alkyl having 1 to 20 carbon atoms, cycloalkyl having 4 to 18 carbon atoms, aralkyl having 7 to 11 carbon atoms and aryl having 6 to 10 carbon atoms.

2. A compound as defined in claim 1 which is isobutoxycarbonylmethyl(di-2-ethylhexy maloyl)phthalate.

3. A compound as defined in claim 1 which is benzyl (di-cyclohexyl maloyl)phthalate.

4. A compound as defined in claim 1 in which is ethoxycarbonylmethyl(di-2-ethylhexyl maloyl)phthalate.

5. A compound as defined in claim 1 which is benzyl (diisodecyl maloyl)phthalate.

6. A compound as defined in claim 1 which is cyclohexoxycarbonylmethyl(di-2-ethylhexyl maloyl)phthalate.

7. A compound as defined in claim 1 which is phenoxycarbonylpropyl(dibenzyl maloyl)phthalate.

8. A compound as defined in claim 1 which is ethoxycarbonylbutyl(diphenyl maloyl)phthalate.

9. A compound as defined in claim 1 which is 2-ethylhexoxycarbonylmethyl(di-ethyl maloyl)phthalate.

References Cited

UNITED STATES PATENTS

| | | | |
|---|---|---|---|
| 2,072,739 | 3/1937 | Dykstra et al. | 260—475 |
| 2,925,352 | 2/1960 | Lowe. | |

LORRAINE A. WEINBERGER, Primary Examiner

E. J. SKELLY, Assistant Examiner

U.S. Cl. X.R.

260—31.8